United States Patent
Takahashi et al.

(10) Patent No.: US 11,050,314 B2
(45) Date of Patent: Jun. 29, 2021

(54) ROTATING ELECTRIC MACHINE

(71) Applicant: DENSO CORPORATION, Kariya (JP)

(72) Inventors: Yoshimitsu Takahashi, Nisshin (JP); Mitsutaka Ito, Nisshin (JP); Hiroshi Shimizu, Kariya (JP); Takeshi Endo, Kariya (JP)

(73) Assignee: DENSO CORPORATION, Kariya (JP)

( * ) Notice: Subject to any disclaimer, the term of this patent is extended or adjusted under 35 U.S.C. 154(b) by 70 days.

(21) Appl. No.: 16/423,737

(22) Filed: May 28, 2019

(65) Prior Publication Data

US 2019/0280548 A1 Sep. 12, 2019

Related U.S. Application Data

(63) Continuation of application No. PCT/JP2017/041195, filed on Nov. 16, 2017.

(30) Foreign Application Priority Data

Nov. 25, 2016 (JP) .............................. JP2016-228835

(51) Int. Cl.
*H02K 3/28* (2006.01)
*H02K 3/04* (2006.01)
(Continued)

(52) U.S. Cl.
CPC ................. *H02K 3/28* (2013.01); *H02K 1/16* (2013.01); *H02K 1/278* (2013.01); *H02K 3/04* (2013.01);
(Continued)

(58) Field of Classification Search
CPC . H02K 3/28; H02K 3/04; H02K 11/33; H02K 1/16; H02K 1/278; H02K 7/006;
(Continued)

(56) References Cited

U.S. PATENT DOCUMENTS

2009/0026895 A1* 1/2009 Chakrabarti ........... H02K 11/33
310/68 D
2011/0175483 A1 7/2011 Koike et al.
(Continued)

FOREIGN PATENT DOCUMENTS

| JP | 2008-035580 A | 2/2008 |
| JP | 2012-210094 A | 10/2012 |
| JP | 2016-63567 A | 4/2016 |

OTHER PUBLICATIONS

English translation of Kimura et al (JP 2012210094 A), printed on Dec. 8, 2020.*

(Continued)

*Primary Examiner* — John K Kim
(74) *Attorney, Agent, or Firm* — Oliff PLC

(57) ABSTRACT

In a rotating electric machine, a stator includes a stator core and three phase windings. In the stator core, a plurality of slots arrayed in a circumferential direction are formed. The three phase windings are wound around the stator core. The three phase windings include first, second, and third windings. One end of the first winding is provided further towards an outer side of the stator in a radial direction than a division line that divides the slot into two in the radial direction of the stator. One end of the second winding is provided further towards an inner side of the stator in the radial direction than the division line. One end of the third winding is provided between the one end of the first winding and the one end of the second winding relative to the radial direction of the stator, with at least a single slot therebetween.

2 Claims, 15 Drawing Sheets

(51) Int. Cl.
*H02K 11/33* (2016.01)
*H02K 1/16* (2006.01)
*H02K 1/27* (2006.01)
*H02K 7/00* (2006.01)
*H02K 21/14* (2006.01)
*H02K 3/34* (2006.01)
*H02K 3/14* (2006.01)
*H02M 7/49* (2007.01)
*B60K 6/26* (2007.10)

(52) U.S. Cl.
CPC .............. *H02K 7/006* (2013.01); *H02K 11/33* (2016.01); *H02K 21/14* (2013.01); *H02M 7/49* (2013.01); *B60K 6/26* (2013.01); *B60Y 2200/91* (2013.01); *B60Y 2200/92* (2013.01); *B60Y 2400/60* (2013.01); *H02K 2213/03* (2013.01); *Y02T 10/64* (2013.01)

(58) Field of Classification Search
CPC .... H02K 21/14; H02K 2213/03; H02K 3/345; H02K 3/14; H02M 7/49; Y02T 10/64; B60K 6/26; B60Y 2200/91; B60Y 2200/92; B60Y 2400/60
USPC ........................................ 310/68 D, 179, 180
See application file for complete search history.

(56) References Cited

U.S. PATENT DOCUMENTS

| | | | |
|---|---|---|---|
| 2014/0246944 A1* | 9/2014 | Koka | H02K 1/165 310/211 |
| 2015/0054375 A1* | 2/2015 | Taniguchi | H02K 3/28 310/208 |
| 2015/0162789 A1* | 6/2015 | Tanaka | H02K 1/276 310/156.21 |
| 2015/0280502 A1* | 10/2015 | Hirotani | H02K 1/276 310/68 R |
| 2016/0204728 A1* | 7/2016 | Notohara | B60L 7/16 62/498 |
| 2016/0315516 A1* | 10/2016 | Saito | B60L 58/10 |
| 2017/0240053 A1* | 8/2017 | Hino | B60W 20/00 |
| 2019/0280548 A1* | 9/2019 | Takahashi | H02K 3/14 |
| 2020/0052638 A1* | 2/2020 | Kinjo | H02K 3/28 |

OTHER PUBLICATIONS

Feb. 6, 2018 International Search Report issued in International Patent Application PCT/JP2017/041195.

\* cited by examiner

ROTATING ELECTRIC MACHINE

CROSS-REFERENCE TO RELATED APPLICATIONS

The present application is a continuation application of International Application No. PCT/JP2017/041195, filed Nov. 16, 2017, which claims priority to Japanese Patent Application No. 2016-228835, filed Nov. 25, 2016. The contents of these applications are incorporated herein by reference in their entirety.

BACKGROUND

Technical Field

The present disclosure relates to a rotating electric machine.

Background Art

Conventionally, a joined segment type electric motor in which a stator winding is formed by a plurality of segment conductors being inserted into slots in a stator core and the segment conductors being joined by welding or the like is known. In related art, a coil that is adjacent in a radial direction to a first circling coil to which a terminal is connected is further towards a neutral point side than a coil that is adjacent in a circumferential direction. As a result, occurrence of partial discharge in a coil end portion at the instant a voltage is applied from the terminal is suppressed.

SUMMARY

An exemplary embodiment provides a rotating electric machine that includes a housing, a rotor, and a stator. The stator includes a stator core in which a plurality of slots arrayed in the circumferential direction are formed and three phase windings that are wound around the stator core. The three phase windings include a first winding, a second winding, and a third winding. One end of the first winding is provided further towards an outer side of the stator in a radial direction than a division line that divides the slot into two in the radial direction of the stator. One end of the second winding is provided further towards an inner side of the stator in the radial direction than the division line. One end of the third winding is provided between the one end of the first winding and the one end of the second winding relative to the radial direction of the stator, with at least a single slot therebetween.

DESCRIPTION OF THE EMBODIMENTS

Figure 1:
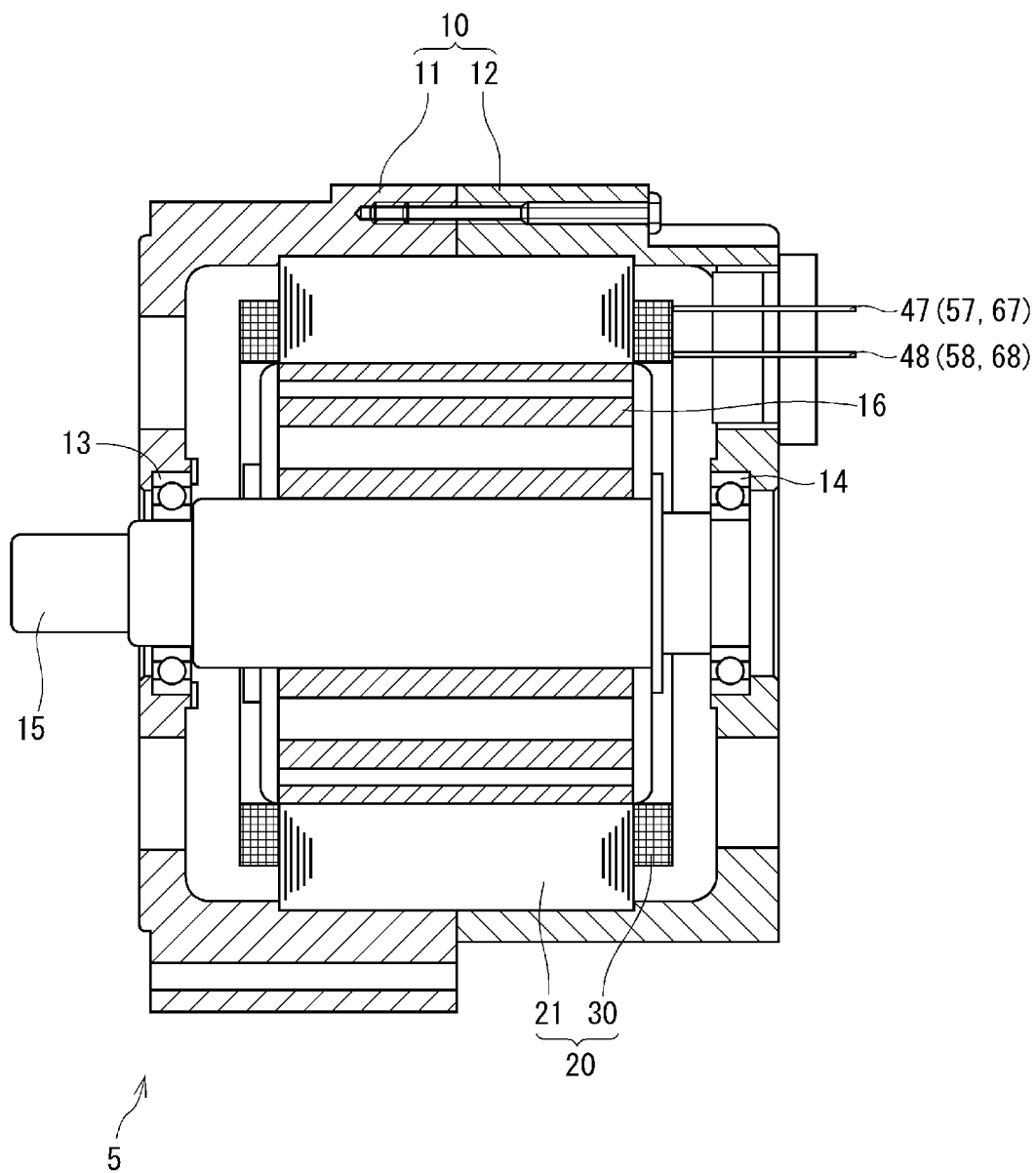
FIG. 1 is a schematic cross-sectional view of a motor generator according to a first embodiment.
Figure 2:
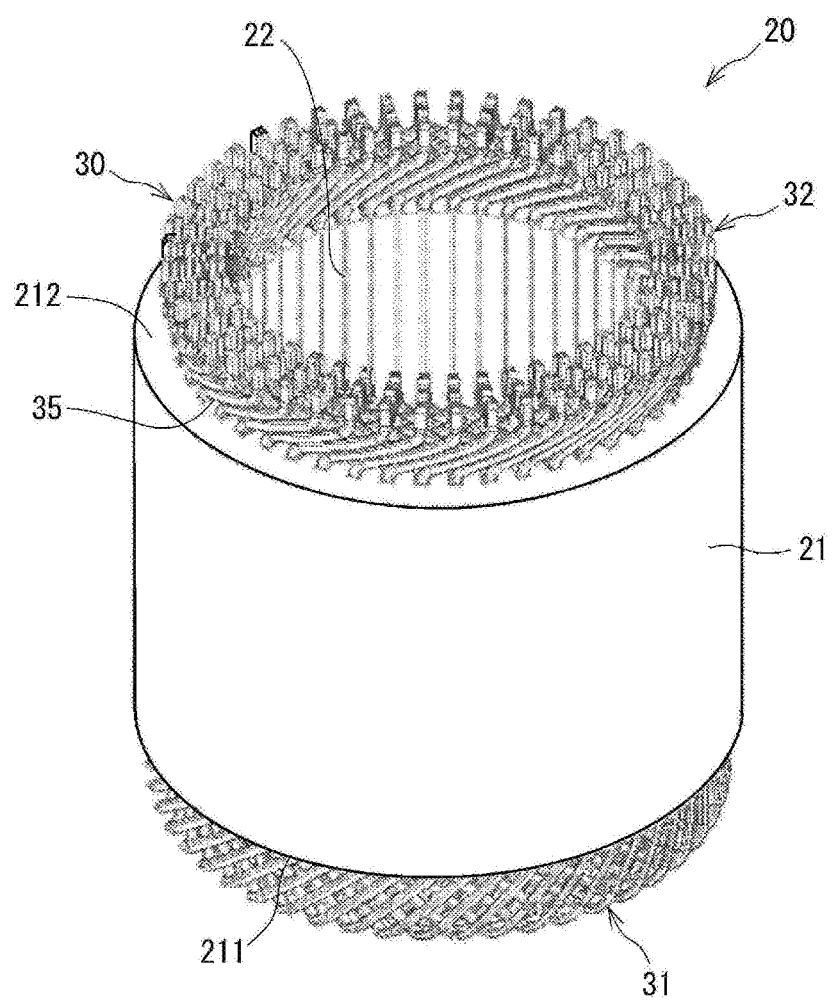
FIG. 2 is a perspective view of a stator according to the first embodiment.

In related art, both end portions of the circling coil are in contact. Therefore, in a system in which a voltage at both end portions becomes high, an insulating film that is capable of withstanding the voltage that is applied to both end portions is required to be formed.

It is thus desired to provide a rotating electric machine that is capable of reducing a maximum voltage among windings.

A first exemplary embodiment provides a rotating electric machine that includes a housing, a shaft, a rotor, and a stator. The shaft is rotatably supported by the housing. The rotor includes a plurality of pairs of magnetic poles that are arrayed in a circumferential direction and is integrally rotated with the shaft. The stator includes a stator core and three phase windings. In the stator core, a plurality of slots arrayed in the circumferential direction are formed. The three phase windings are wound around the stator core. The three phase windings include a first winding, a second winding, and a third winding. One end of the first winding is provided further towards an outer side of the stator in a radial direction than a division line that divides the slot into two in the radial direction of the stator. The other end of the first winding is provided further towards an inner side of the stator in the radial direction than the division line. One end and the other end of the second winding are provided further towards an inner side of the stator than the division line. One end of the third winding is provided between the one end of the first winding and the one end of the second winding relative to the radial direction of the stator, with at least a single slot therebetween. The other end of the third winding is provided further towards the outer side of the stator in the radial direction than the division line.

The one ends of the windings corresponding to three phases are not in contact. As a result, a voltage between an intermediate location of the first winding and the one end of the third winding, and a voltage between an intermediate location of the second winding and the one end of the third winding are a maximum voltage. The voltage is lower than a voltage between the one ends of the windings, and the maximum voltage at a contact location within the rotating electric machine can be reduced. In addition, an insulating film of the winding can be made thinner.

A second exemplary embodiment provides a rotating electric machine that includes a housing, a shaft, a rotor, and a stator, similar to that described above.

One end of the first winding is provided further towards an outer side of the stator in a radial direction than a first division line that divides the slot into two in the radial direction of the stator and further towards one side of the stator than a second division line that divides the slot into two in the circumferential direction of the stator. The other end of the first winding is provided further towards an inner side of the stator in the radial direction than the first division line.

One end of the second winding is provided further towards the inner side of the stator in the radial direction than the first division line and further towards an other side of the stator than the second division line. The other end of the second winding is provided further towards the inner side of the stator in the radial direction than the first division line.

One end of the third winding is provided further towards the outer side of the stator in the radial direction than the first division line and between the one end of the first winding and the one end of the second winding relative to the circumferential direction of the stator. The other end of the third winding is provided further towards the inner side of the stator in the radial direction than the first division line.

Effects similar to those described above are obtained as a result of a configuration such as this, as well.

Embodiments of the present disclosure will hereinafter be described with reference to the drawings. According to the embodiments below, configurations that are essentially identical are given the same reference numbers. Descriptions thereof are omitted. In addition, when reference is made to a present embodiment, the embodiments are included.

First Embodiment

A rotating electric machine according to a first embodiment is shown in FIG. 1 to FIG. 11. As shown in FIG. 1, a motor generator 5 that serves as the rotating electric machine includes a housing 10, a shaft 15, a rotor 16, and a stator 20. For example, the motor generator 5 is applied to an electric vehicle, such as an electric car or a hybrid vehicle, and generates driving torque. In addition, the motor generator 5 provides a function as an electric motor for driving drive wheels, and a function as a power generator that generates electric power from kinetic energy that is transmitted from an engine or the drive wheels. The motor generator 5 according to the present embodiment is a three-phase, brushless rotating electric machine.

The housing 10 is formed by a pair of housing members 11 and 12 being joined. The housing members 11 and 12 are formed into a bottomed cylindrical shape. A bearing 13 is formed in a bottom portion of the housing member 11, and a bearing 14 is formed in a bottom portion of the housing member 12. The shaft is rotatably supported to the housing 10 via the bearings 13 and 14.

The rotor 16 has a plurality of pairs of magnetic poles that are arrayed in a circumferential direction. The rotor 16 is fixed to the shaft 15 and is integrally rotated with the shaft 15. The rotor 16 has a plurality of permanent magnets on an outer peripheral surface such that the magnetic poles alternate at a predetermined interval in the circumferential direction. Instead of the permanent magnets, the rotor 16 may be a winding field-type in which a field winding is wound.

According to the present embodiment, the number of magnetic poles M is eight in which four poles are N poles and four poles are S poles.

As shown in FIG. 2 to FIG. 6, the stator 20 is provided on an outer side of the rotor 16 in the radial direction. In addition, the stator 20 has a stator core 21 and a winding 30. The stator core 21 is such that a plurality of core sheets are laminated in an axial direction and fixed to the housing 10. The core sheet is composed of a steel sheet. In addition, the stator core 21 includes a plurality of slots 22 and insulators 24.

The slots 22 are formed in a radiating manner at an even pitch. The winding 30 is wound around the slots 22. According to the present embodiment, for each pole of the rotor 16, a slot multiple k-number of slots 22 are formed for each phase. For example, when the slot multiple k=2, 8 [poles]×3 [phases]×2=48 slots 22 are formed. According to the present embodiment, the slot multiple k is 2.

A single slot 22 is formed such at six inserting portions 36 of the segment conductors 35 can be inserted in the radial direction. The insulator 24 is provided in the slot 22 and provides insulation between the stator 20 and the winding 30. The winding 30 is configured by the plurality of segment conductors 35 being electrically connected.

Figure 3:
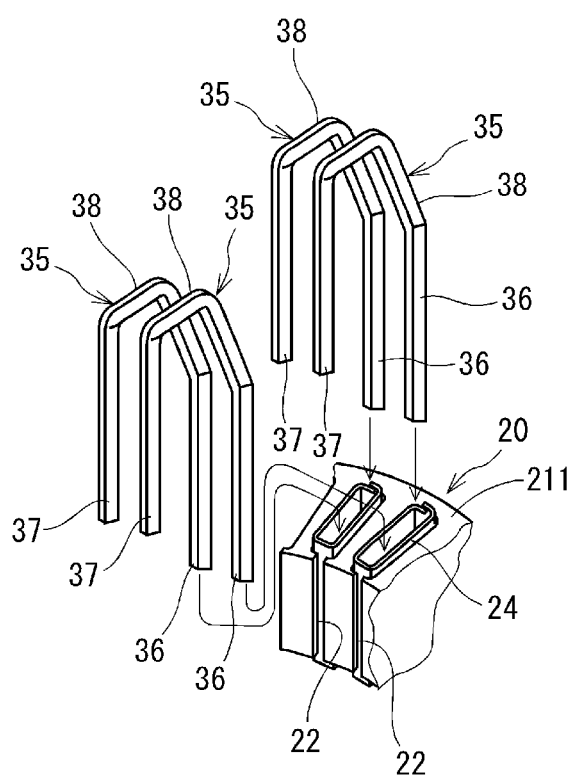
FIG. 3 is a perspective view of slots and segment conductors according to the first embodiment.
Figure 4:
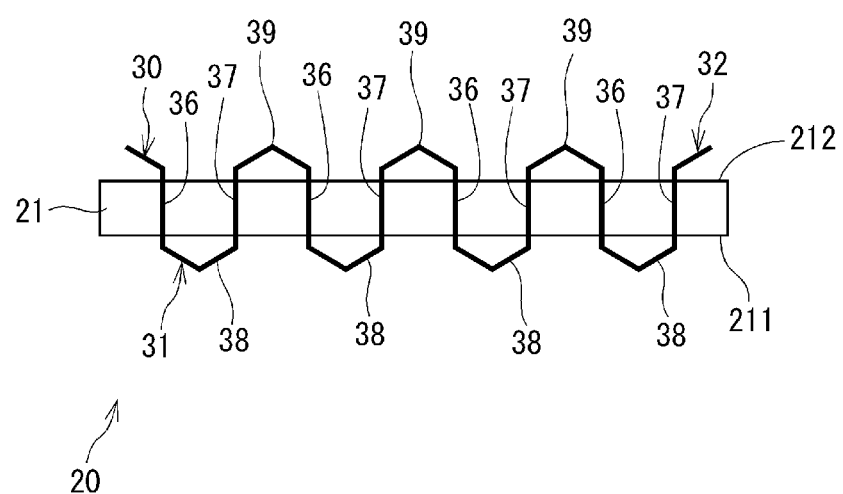
FIG. 4 is a schematic diagram in which a state in which four segment conductors according to the first embodiment are connected is expanded in a circumferential direction.

As shown in FIG. 3 and FIG. 4, the segment conductor 35 is formed by a conductor that is covered by an insulating film being bent into a U-shape. In addition, the segment conductor 35 has the inserting portions 36 and a turn portion 38. The inserting portions 36 form a pair of inserting portions 36 that are parallel to each other. The turn portion 38 connects one ends of the inserting portions 36.

The pair of inserting portions 36 is inserted into differing slots 22 from a first end portion 211 side that is one end portion of the stator core 21 in the axial direction. At this time, the turn portion 38 protrudes towards the first end portion 211 side and a first coil end 31 is formed. The inserting portion 36 on a tip end side is electrically connected to another inserting portion 36 or a connecting wire by welding. At this time, a second coil end 32 is formed on a second end portion 212 side of the stator 20.

A location at which two segment conductors 35 are connected is a connecting portion 39. Here, the insulating film at the location at which the segment conductors 35 are electrically connected to each other, or the segment conductor 35 and the connecting wire are electrically connected to each other is peeled as appropriate.

Figure 5:
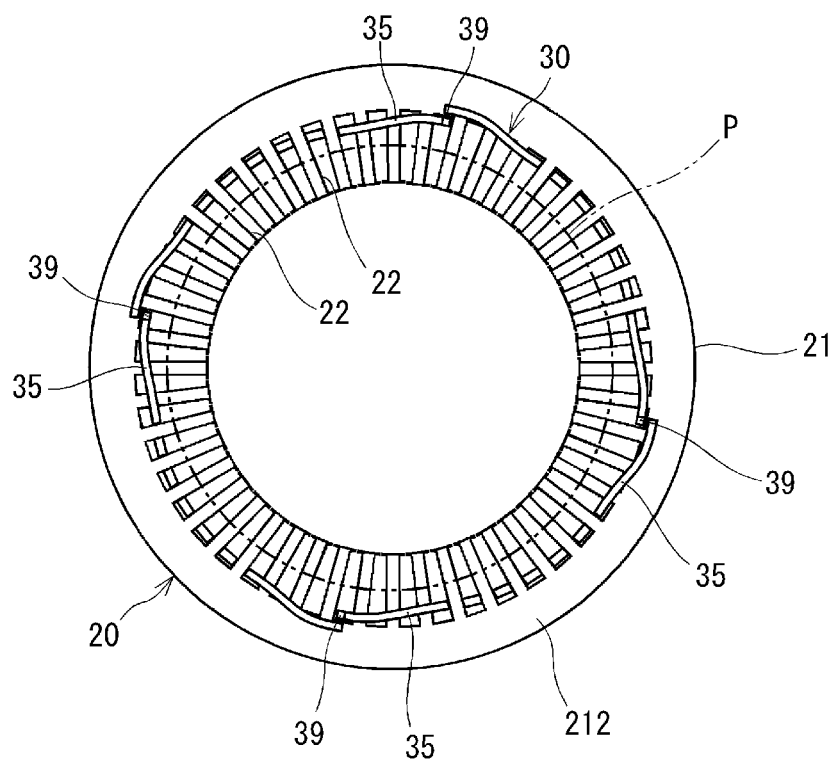
FIG. 5 is a plan view of a state in which four segment conductors according to the first embodiment are connected.
Figure 6:
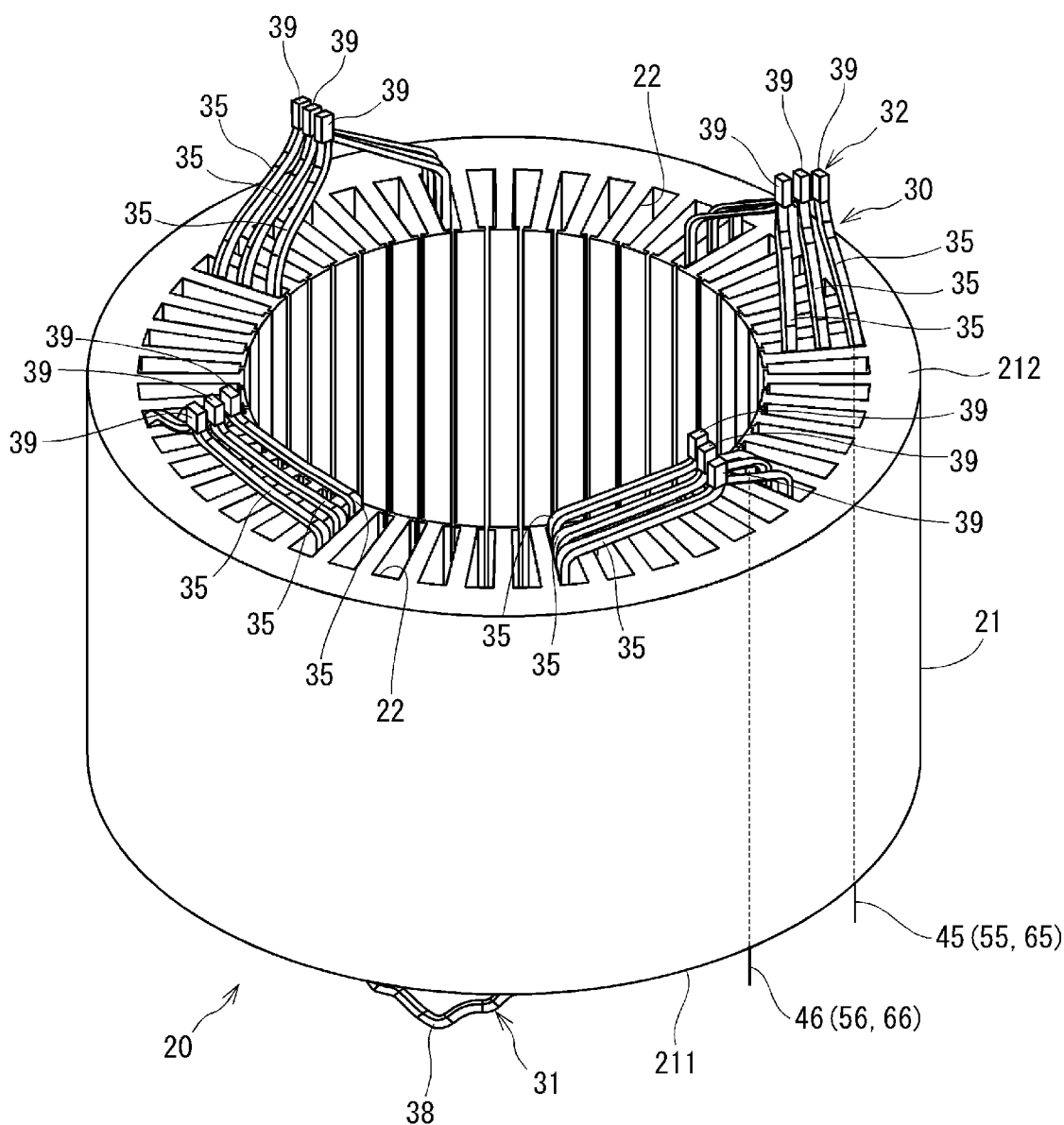
FIG. 6 is a perspective view of a single partial winding according to the first embodiment.

As shown in FIG. 4 and FIG. 5, the winding 30 makes a single turn around the stator core 21 as a result of four segment conductors 35 being connected. As shown in FIG. 6, a single partial winding, described hereafter, is formed by twelve segment conductors 35 being connected. Details such as an arrangement of the segment conductors 35 and a winding direction will be described hereafter.

The winding 30 has a U-phase winding 40, a V-phase winding 50, and a V-phase winding 60. According to the present embodiment, the U-phase winding 40, the V-phase winding 50, and the W-phase winding 60 correspond to "three phase windings." The U-phase winding 40, the V-phase winding 50, and the W-phase winding 60 are also referred to hereafter as "phase windings 40, 50, and 60," as appropriate.

Figure 7:
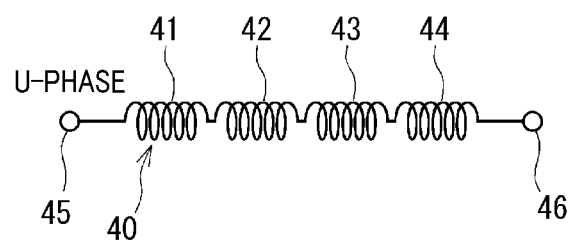
FIG. 7 is an explanatory diagram of each phase winding according to the first embodiment.
Figure 7:
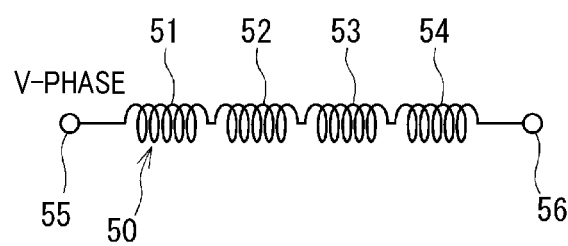
Figure 7:
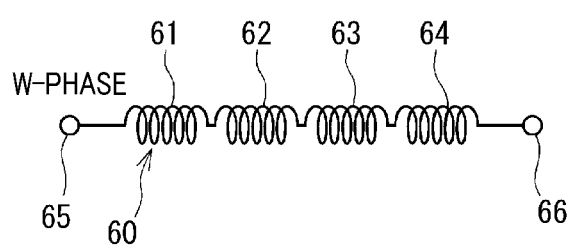

As shown in FIG. 7, the U-phase winding 40, the V-phase winding 50, and the W-phase winding 60 are divided into n-number of partial windings, where n is an integer of 2 or more. According to the present embodiment, n=4. The U-phase winding 40, the V-phase winding 50, and the W-phase winding 60 are each divided into four partial windings.

Figure 8:
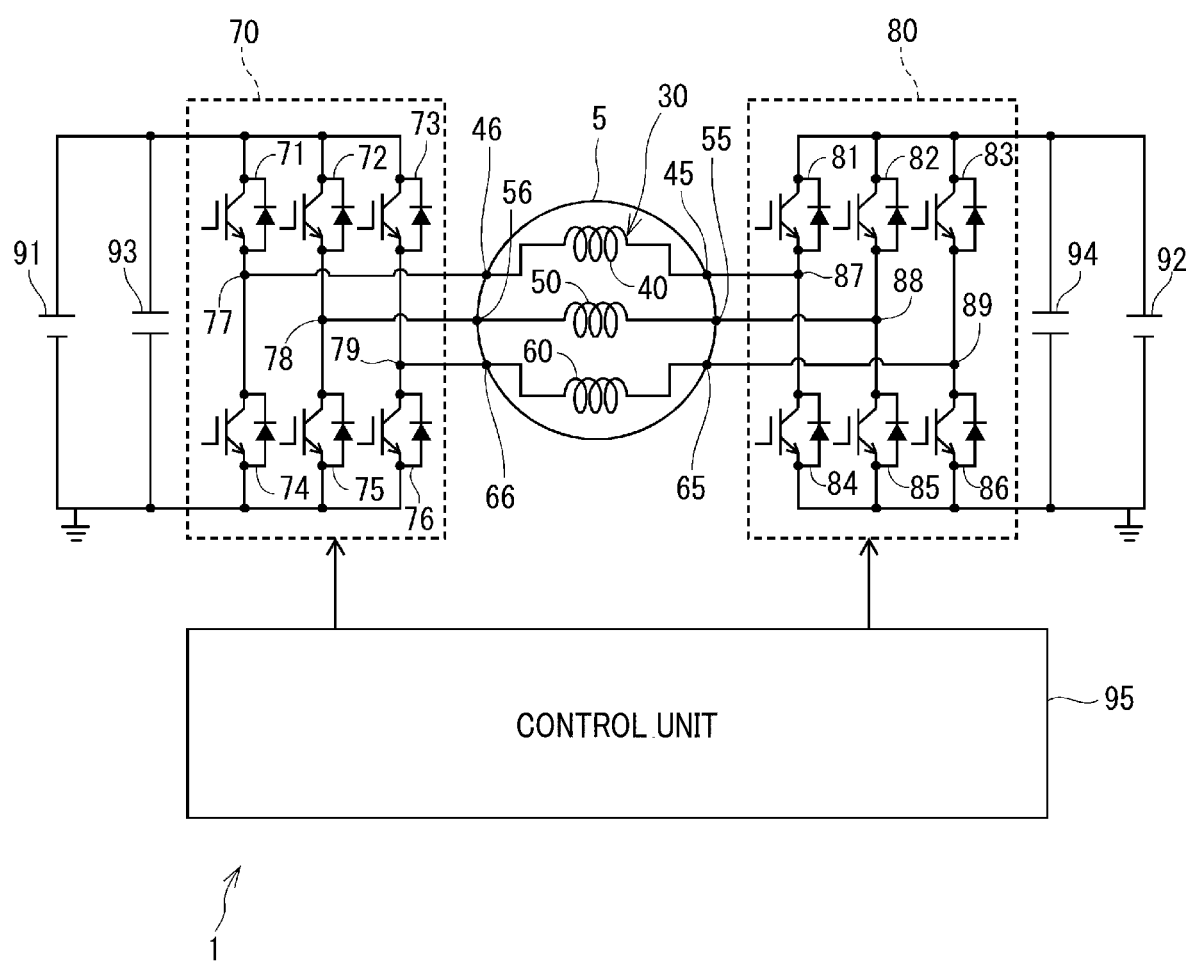
FIG. 8 is a configuration diagram for explaining a power conversion system to which the motor generator according to the first embodiment is applied.

As shown in FIG. 7 and FIG. 8, the U-phase winding 40 has a first U-phase partial winding 41, a second U-phase partial winding 42, a third U-phase partial winding 43, and a fourth U-phase partial winding 44. The U-phase winding 40 is configured as a wave winding. The U-phase partial windings 41 to 44 are connected in series. One end 45 of the U-phase winding 40 is connected to a second inverter unit 80. Another end 46 of the U-phase winding 40 is connected to a first inverter unit 70.

The V-phase winding 50 has a first V-phase partial winding 51, a second V-phase partial winding 52, a third V-phase partial winding 53, and a fourth V-phase partial winding 54. The V-phase winding 50 is configured as a wave winding. The V-phase partial windings 51 to 54 are connected in series. One end 55 of the V-phase winding 50 is connected to the second inverter unit 80. Another end 56 of the V-phase winding 50 is connected to the first inverter unit 70.

The W-phase winding 60 has a first W-phase partial winding 61, a second W-phase partial winding 62, a third W-phase partial winding 63, and a fourth W-phase partial winding 64. The W-phase winding 60 is configured as a wave winding. The W-phase partial windings 61 to 64 are connected in series. One end 65 of the W-phase winding 60 is connected to the second inverter unit 80. Another end 66 of the W-phase winding 60 is connected to the first inverter unit 70.

The one end 45 of the U-phase winding 40 is connected to a drawn-out wire 47. The other end 46 of the U-phase winding 40 is connected to a drawn-out wire 48. The one end 55 of the V-phase winding 50 is connected to a drawn-out wire 57. The other end 56 of the V-phase winding 50 is connected to a drawn-out wire 58. The one end 65 of the W-phase winding 60 is connected to a drawn-out wire 67. The other end 66 of the W-phase winding 60 is connected to a drawn-out wire 68.

As shown in FIG. 1, the drawn-out wires 47, 48, 57, 58, 67, and 68 are drawn out from an axial-direction end portion of the housing 10. The drawn-out wires 47, 57, and 67 are drawn out from the inner side of the slots 22 in the radial direction. The drawn-out wires 48, 58, and 68 are drawn out from the outer side of the slots 22 in the radial direction. Here, in FIG. 1, to prevent the drawing from becoming complicated, only one of the drawn-out wires 47, 57, and 67 and only one of the drawn-out wires 48, 58, and 68 are shown. Hereafter, in FIG. 8 and the like, the U-phase winding 40 is shown as a single coil. This similarly applies to the V-phase winding 50 and the W-phase winding 60.

As shown in FIG. 8, a power conversion system 1 includes a motor generator 5, the first inverter unit 70, and the second inverter unit 80. The first inverter unit 70 is a three-phase inverter and is capable of switching energization to the winding 30. In addition, the first inverter unit 70 is connected to six switching elements 71 to 76. The other end 46 of the U-phase winding 40 is connected to a connection point 77 between the high-potential side switching element 71 and the low-potential side switching element 74. The other end 56 of the V-phase winding 50 is connected to a connection point 78 between the high-potential side switching element 72 and the low-potential side switching element 75. The other end 66 of the W-phase winding 60 is connected to a connection point 79 between the high-potential side switching element 73 and the low-potential side switching element 76.

The second inverter unit 80 is a three-phase inverter and is capable of switching energization to the winding 30. In addition, the second inverter unit 80 is connected to six switching elements 81 to 86. The one end 45 of the U-phase winding 40 is connected to a connection point 87 between the high-potential side switching element 81 and the low-potential side switching element 84. The one end 55 of the V-phase winding 50 is connected to a connection point 88 between the high-potential side switching element 82 and the low-potential side switching element 85. The one end 65 of the W-phase winding 60 is connected to a connection point 89 between the high-potential side switching element 83 and the low-potential side switching element 86.

According to the present embodiment, the first inverter unit 70 and the second inverter unit 80 are connected to both sides of the winding 30. According to the present embodiment, the switching elements 71 to 76 and 81 to 86 are insulated gate bipolar transistors (IGBTs). The switching elements 71 to 76 and 81 to 86 may also be metal-oxide semiconductor field-effect transistors (MOSFETs), bipolar transistors, or the like. Hereafter, the switching elements 71 to 73 and 81 to 83 that are connected to the high-potential side are referred to as "upper arm elements," and the switching elements 74 to 76 and 84 to 86 that are connected to the low-potential side are referred to as "lower arm elements," as appropriate.

A first battery 91 that serves as a "first power supply source" is a direct-current power supply that is capable of being charged and discharging. The first battery 91 is connected to the first inverter unit 70. In addition, the first battery 91 is provided so as to be capable of transmitting and receiving electric power to and from the motor generator 5 via the first inverter unit 70. A voltage of the first battery 91 is a first voltage V1.

A second battery 92 that serves as a "second power supply source" is a direct-current power supply that is capable of being charged and discharging. The second battery 92 is connected to the second inverter unit 80. In addition, the second battery 92 is provided so as to be capable of transmitting and receiving electric power to and from the motor generator 5 via the second inverter unit 80. A voltage of the second battery 92 is a second voltage V2. The second voltage V2 is set to be equal to or greater than the first voltage V1. According to the first embodiment, V1=200 [V] and V2=600 [V].

A first capacitor 93 is connected in parallel to the first battery 91. The first capacitor 93 smoothes a current supplied from the first battery 91 to the first inverter unit 70 or a current supplied from the first inverter unit 70 to the first battery 91. A second capacitor 94 is connected in parallel to the second battery 92. The second capacitor 94 smoothes a current supplied from the second battery 92 to the second inverter unit 80 or a current supplied from the second inverter unit 80 to the second battery 92.

A control unit 95 is configured as a typical computer. The control unit 95 includes therein a central processing unit (CPU), a read-only memory (ROM), a random access memory (RAM), an input/output (I/O), a bus that connects the foregoing, and the like. The control unit 95 generates a control signal to control on/off of the switching elements 71 to 76 and 81 to 86.

Figure 9:
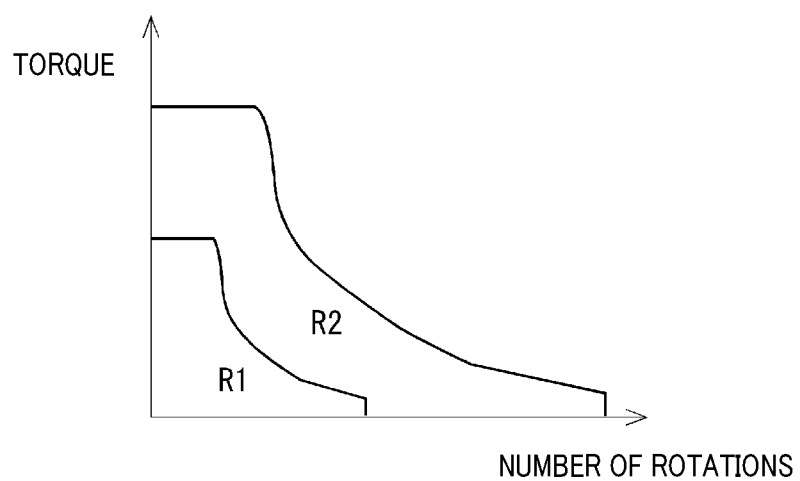
FIG. 9 is an explanatory diagram of drive regions according to the first embodiment.

Driving modes of the motor generator 5 will be described. As shown in FIG. 9, according to the present embodiment, a "one-side driving mode" is set in a drive region R1 in which rotation speed and torque are relatively low. In addition, a "both-side driving mode" is set in a drive region R2 in which rotation speed and torque are relatively high.

In the one-side driving mode, the upper arm elements 81 to 83 of the second inverter unit 80 are set to three-phase simultaneous-on, and the lower arm elements 84 to 86 are set to three-phase simultaneous-off. As a result, the second inverter unit 80 side becomes a neutral point. In addition, when the upper arm elements 81 to 83 are set to three-phase simultaneous-off and the lower arm elements 84 to 86 are set to three-phase simultaneous-on as well, the second inverter unit 80 side similarly becomes the neutral point.

In addition, pulse width modulation (PWM) control is performed on the first inverter 70 based on a fundamental wave that is based on a voltage command, and a carrier wave that is a triangular wave or the like. Here, PWM control includes sine-wave PWM control and overmodulation PWM control. In sine-wave PWM control, an amplitude of the fundamental wave is equal to or less than an amplitude of the carrier wave. In overmodulation PWM control, the amplitude of the fundamental wave is greater than the amplitude of the carrier wave. At this time, a drive voltage that is a voltage applied to the motor generator 5 is that in which the height of a pulse is the first voltage V1.

In addition, as a result of the upper arm elements 71 to 73 of the first inverter unit 70 being set to three-phase simultaneous-on and the lower arm elements 74 to 76 being set to three-phase simultaneous-off, the first inverter 70 side may become the neutral point, and PWM control of the second inverter unit 80 may be performed. The first inverter unit 70 side similarly becomes the neutral point by the upper arm elements 71 to 73 being set to three-phase simultaneous-off and the lower arm elements 74 to 76 being set to three-phase simultaneous-on, as well. At this time, the drive voltage that is the voltage applied to the motor generator 5 is that in which the height of the pulse is the second voltage V2. As a result of either of the inverter units 70 and 80 becoming the neutral point, switching loss can be reduced. In addition, as a result of the inverter unit 70 or 80 to become the neutral point and the elements to be set to three-phase simultaneous-on being switched as appropriate, heat generation caused by an on-state of a certain element being continued, and imbalance in heat loss among the elements can be reduced.

In the both-side driving mode, PWM control or rectangular wave control is performed on the first inverter unit 70 and the second inverter unit. The fundamental wave related to driving of the first inverter unit 70 is a first fundamental wave and the fundamental wave related to driving of the second inverter unit 80 is a second fundamental wave. In PWM control, phases of the first fundamental wave and the second fundamental wave are inverse. The phases of the first fundamental wave and the second fundamental wave are shifted by 180[°].

As a result of the phases of the fundamental waves being inverted, the elements that are turned on in each phase are opposite in terms of upper and lower elements, between the first inverter unit 70 and the second inverter unit 80. As a result, a voltage that corresponds to a state in which the first battery 91 and the second battery 92 are connected in series can be applied to the motor generator 5. The phase difference between the first fundamental wave and the second fundamental wave is 180[°]. However, shifting to an extent that the voltage corresponding to the state in which the first battery 91 and the second battery 92 are connected in series can be applied is allowed.

In the both-side driving mode, in the first inverter unit 70, the U-phase upper arm element 71 is turned on, and the V-phase and W-phase lower arm elements 75 and 76 are turned on. At the same time, in the second inverter unit 80, the U-phase lower arm element 84 is turned on and the V-phase and W-phase upper arm elements 82 and 83 are turned on. At this time, the drive voltage is that in which the height of the pulse is a sum of the first voltage V1 and the second voltage V2.

Conventionally, a segment joint-type electric motor in which a stator winding is formed by a plurality of segment conductors being inserted into slots in a stator core and the segment conductors being joined by welding or the like is known. In PTL 1, a coil that is adjacent in a radial direction to a first circling coil to which a terminal is connected is further towards a neutral point side than a coil that is adjacent in a circumferential direction. As a result, occurrence of partial discharge in a coil end portion at the instant a voltage is applied from the terminal is suppressed.

In PTL 1, both end portions of the circling coil are in contact. Therefore, in a system in which a voltage at both end portions becomes high, an insulating film that is capable of withstanding the voltage that is applied to both end portions is required to be formed. Here, the motor generator 5 according to the present embodiment is capable of reducing a maximum voltage among the windings 30.

Details of the winding 30 according to the present embodiment will be described with reference to FIG. 10.

Figure 10:
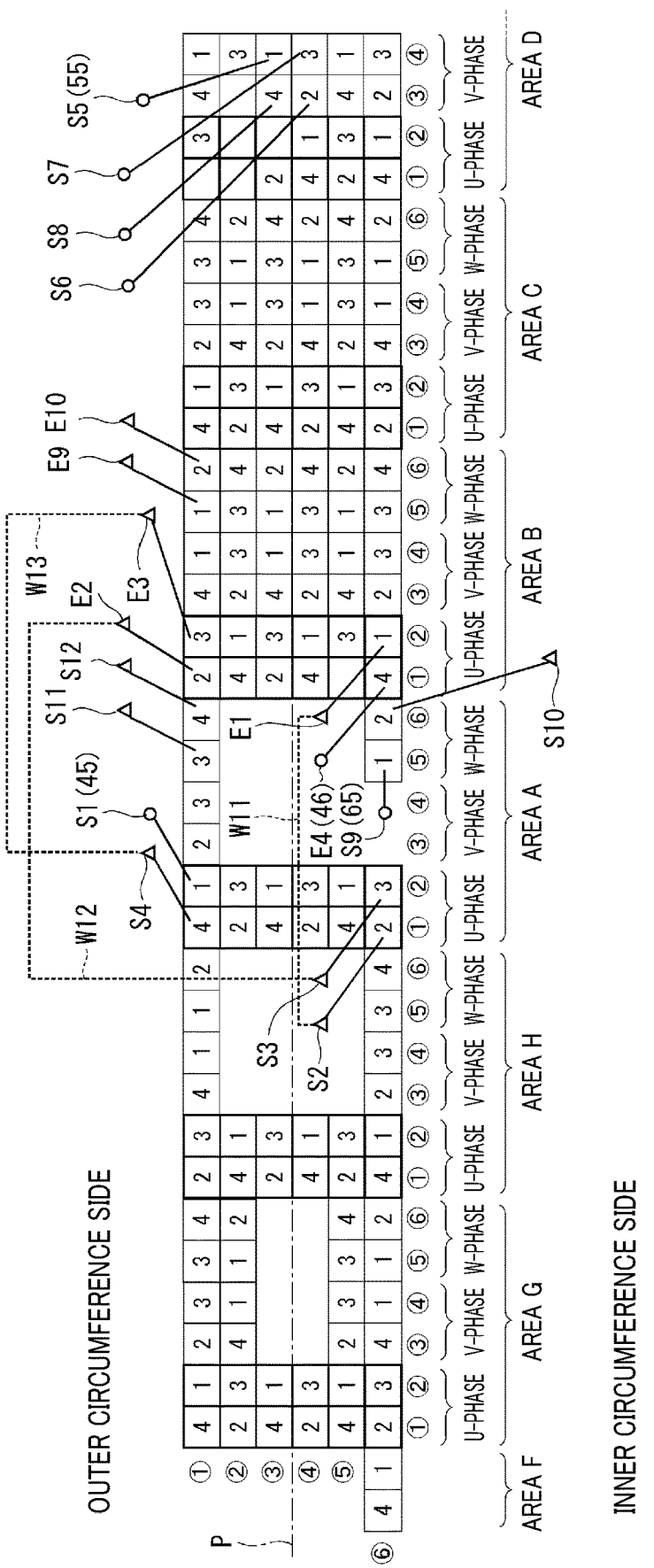
FIG. 10 is a diagram for explaining windings according to the first embodiment.

FIG. 10 is a diagram for explaining the partial windings that correspond to the segment conductors 35 that are inserted into the slots 22. For example, "1" in a U-phase slot means that the first U-phase partial winding 41 is configured. In FIG. 10, a left/right direction on a paper surface on which the drawing is printed is the circumferential direction of the stator 20. The direction from right to left on the paper surface is a counter-clockwise direction, and the direction from left to right on the paper surface is a clockwise direction. In addition, an up/down direction on the paper surface corresponds to the radial direction of the stator 20. An upper side of the paper surface is the outer side in the radial direction, and a lower side is the inner side in the radial direction.

According to the present embodiment, the slot multiple k=2. Therefore, in the stator 20, 3 [phases]×2 (slot multiple)=6 slots 22, corresponding to a single magnetic pole, serves as an "area." In addition, according to the present embodiment, the number of magnetic poles M=8. Therefore, the number of areas is 8. An area that includes the slot 22 into which the inserting portion 36 furthest towards the one end 45 side of the U-phase winding 40 is inserted is an "area A." In addition, an area B, an area C, . . . are set clockwise from the area A, and an area H, an area Q . . . are set counter-clockwise from the area A. Slot numbers in each area are 1 to 6 in the clockwise direction. Round numbers that indicate the positions within the slot 22 are 1 to 6 from the outer side in the radial direction. In FIG. 10, the slot numbers and the round numbers are shown as numbers with a circle. Hereafter, the location in which the inserting portion 36 is inserted is indicated by the area, the slot number, and the round number, in this order. Specifically, the location in which the inserting portion 36 that serves as the furthermost one end 45 of the U-phase winding 40 is indicated as "A21."

In addition, in FIG. 10, the slots 22 into which the segment conductors 35 configuring the U-phase winding 40 are inserted are indicated by thick lines. Furthermore, the slots 22 into which the segment conductors 35 configuring the V-phase winding 50 and the W-phase winding 60 are inserted are indicated by thin lines.

In FIG. 10, the segment conductors 35 are indicated by solid lines and the connecting wires are indicated by broken lines. A location marked by a circle means that the location is the one end 45 or the other end 46 of the U-phase winding 40, the one end 55 or the other end 56 of the V-phase winding 50, and the one end 65 or the other end 66 of the W-phase winding. A location marked by a triangle means that the location is a location connected by the connecting wire.

Respective end portions of the U-phase partial windings 41 to 44 on the one end 45 side are S1 to S4. Respective end portions of the U-phase partial windings 41 to 44 on the other end 46 side are E1 to E4. A starting end S1 corresponds to the one end 45 of the U-phase winding 40 and a terminating end E4 corresponds to the other end 46 of the U-phase winding.

Respective end portions of the V-phase partial windings 51 to 54 on the one end 55 side are S5 to S8. Respective end portions of the V-phase partial windings 51 to 54 on the other end 56 side are E5 to E8. A starting end S5 corresponds to the one end 55 of the V-phase winding 50 and a terminating end E8 corresponds to the other end 56 of the V-phase winding.

Respective end portions of the W-phase partial windings 61 to 64 on the one end 65 side are S9 to S12. Respective end portions of the W-phase partial windings 61 to 64 on the other end 66 side are E9 to E12. A starting end S9 corresponds to the one end 65 of the W-phase winding 60 and a terminating end E12 corresponds to the other end 66 of the W-phase winding.

As shown in FIG. 10, in the area A, the segment conductors 35 configuring the second U-phase partial winding 42 and the fourth U-phase partial winding 44 are inserted in the A1 slot. The segment conductors 35 configuring the first U-phase partial winding 41 and the third U-phase partial winding 43 are inserted in the A2 slot.

The segment conductors 35 configuring the second V-phase partial winding 52 and the fourth V-phase partial winding 54 are inserted in the A3 slot. The segment conductors 35 configuring the first V-phase partial winding 51 and the third V-phase partial winding 53 are inserted in the A4 slot.

The segment conductors 35 configuring the first W-phase partial winding 61 and the third W-phase partial winding 63 are inserted in the A5 slot. The segment conductors 35 configuring the second W-phase partial winding 62 and the fourth W-phase partial winding 64 are inserted in the A6 slot. This similarly applies to the other areas.

The segment conductor 35 furthest towards the one end 45 side of the U-phase winding 40 is inserted into the slots 22 such that one inserting portion 36 is inserted into A21 and the other inserting portion 36 is inserted into H22. The segment conductor 35 that is second from the one end 45 side of the U-phase winding 40 is inserted into the slots 22 such that one inserting portion 36 is inserted into G21 and the other inserting portion 36 is inserted into F22.

According to the first embodiment, the inserting portion 36 is inserted into a location at which the slot number in the area corresponding to the adjacent magnetic pole is the same and the position in the radial direction is shifted by one In addition, the segment conductor 35 furthest towards the one end 45 side of the U-phase winding 40 and the second segment conductor 35 are connected by the inserting portion 36 that is inserted into B22 and the inserting portion 36 that is inserted into C21 being connected by welding or the like. According to the first embodiment, the winding 30 is configured by differing segment conductors 35 being electrically connected.

Hereafter, the slot positions and the winding direction in which the inserting portions 36 are inserted will be described.

In the first U-phase partial winding 41, twelve segment conductors 35 are connected in order from A21, H22, G21, F22, E21, D22, C21, B22, A23, H24, . . . C23, B24, A25, H26, . . . C25 to B26. The first U-phase partial winding 41 is wound in the counter-clockwise direction, and wound from the outer side to the inner side in the radial direction.

In the second U-phase partial winding 42, twelve segment conductors 35 are connected in order from A16, H15, G16, F15, E16, D15, C16, B15, A14, H13, . . . C14, B13, A12, H11, . . . C12 to B11. The second U-phase partial winding 42 is wound in the counter-clockwise direction, and wound from the inner side to the outer side in the radial direction.

In the third U-phase partial winding 43, twelve segment conductors 35 are connected in order from A26, H25, G26, F25, E26, D25, C26, B25, A24, H23, . . . C24, B23, A22, H21, . . . C22 to B21. The third U-phase partial winding 43 is wound in the counter-clockwise direction, and wound from the inner side to the outer side in the radial direction.

In the fourth U-phase partial winding 44, twelve segment conductors 35 are connected in order from A11, H12, G11, F12, E11, D12, C11, B12, A13, H14, . . . C13, B14, A15, H16, . . . C15 to B16. The fourth U-phase partial winding 44 is wound in the counter-clockwise direction, and wound from the outer side to the inner side in the radial direction.

The terminating end E1 of the first U-phase partial winding 41 and the starting end S2 of the second U-phase partial winding 42 are connected by a connecting wire W11. The terminating end E2 of the second U-phase partial winding 42 and the starting end S3 of the third U-phase partial winding 43 are connected by a connecting wire W12. The terminating end E3 of the third U-phase partial winding 43 and the starting end S4 of the fourth U-phase partial winding 44 are connected by a connecting wire W13.

In the first V-phase partial winding 51, twelve segment conductors 35 are connected in order from D43, C44, B43, A44, H43, G44, F43, E44, D45, C46, . . . F45, E46, D41, C42, . . . F41 to E42. The first V-phase partial winding 51 is wound in the counter-clockwise direction.

In the second V-phase partial winding 52, twelve segment conductors 35 are connected in order from D34, C33, B34, A33, H34, G33, F34, E33, D32, C31, . . . F32, E31, D36, C35, . . . F36 to E35. The second V-phase partial winding 52 is wound in the counter-clockwise direction.

In the third V-phase partial winding 53, twelve segment conductors 35 are connected in order from D44, C43, B44, A43, H44, G43, F44, E43, D42, C41, . . . F42, E41, D46, C45, . . . F46 to E45. The third V-phase partial winding 53 is wound in the counter-clockwise direction.

In the fourth V-phase partial winding 54, twelve segment conductors 35 are connected in order from D33, C34, B33, A34, H33, G34, F33, E34, D35, C36, . . . F35, E36, D31, C32, . . . F31 to E32. The fourth V-phase partial winding 54 is wound in the counter-clockwise direction.

The terminating end E5 of the first V-phase partial winding 51 and the starting end S6 of the second V-phase partial winding 52 are connected by a connecting wire. The terminating end E6 of the second V-phase partial winding 52 and the starting end S7 of the third V-phase partial winding 53 are connected by a connecting wire. The terminating end E7 of the third V-phase partial winding 53 and the starting end S8 of the fourth V-phase partial winding 54 are connected by a connecting wire W.

In the first W-phase partial winding 61, twelve segment conductors 35 are connected in order from A56, H55, G56, F55, E56, D55, C56, B55, A54, H53, . . . C54, B53, A52, H51, . . . C52 to B51. The first W-phase partial winding 61 is wound in the counter-clockwise direction, and wound from the outer side to the inner side in the radial direction.

In the second W-phase partial winding 62, twelve segment conductors 35 are connected in order from A66, H65, G66, F65, E66, D65, C66, B65, A64, H63, . . . C64, B63, A62, H61, . . . C62 to B61. The second W-phase partial winding 62 is wound in the counter-clockwise direction, and wound from the inner side to the outer side in the radial direction.

In the third W-phase partial winding 63, twelve segment conductors 35 are connected in order from A51, H52, G51, F52, E51, D52, C51, B52, A53, H54, . . . C53, B54, A55, H56, . . . C55 to B56. The third W-phase partial winding 63 is wound in the counter-clockwise direction, and wound from the outer side to the inner side in the radial direction.

In the fourth W-phase partial winding 64, twelve segment conductors 35 are connected in order from A61, H62, G61, F62, E61, D62, C61, B62, A63, H64, . . . C63, B64, A65, H66, . . . C65 to B66. The fourth W-phase partial winding 64 is wound in the counter-clockwise direction, and wound from the outer side to the inner side in the radial direction.

The terminating end E9 of the first W-phase partial winding 61 and the starting end S10 of the second W-phase partial winding 62 are connected by a connecting wire. The terminating end E10 of the second W-phase partial winding 62 and the starting end S11 of the third W-phase partial winding 63 are connected by a connecting wire. The terminating end E11 of the third W-phase partial winding 63 and the starting end S12 of the fourth W-phase partial winding 64 are connected by a connecting wire. In FIG. 10, to avoid complication, the connecting wires of the V-phase winding 50 and the W-phase winding 60 are omitted. In addition, the winding direction according to the first embodiment is wound in one direction, that is, the counter-clockwise direction. The winding direction is not limited to the counter-clockwise direction and may be the clockwise direction.

According to the first embodiment, the starting end S1 corresponding to the one end 45 of the U-phase winding 40 is provided further towards the outer side in the radial direction that a division line P that divides the slot 22 into two in the radial direction of the stator 20. In addition, the starting end S9 corresponding to the one end 65 of the W-phase winding 60 is provided further towards the inner side in the radial direction that the division line P. Furthermore, the starting end S5 corresponding to the one end 55 of the V-phase winding 50 is provided between the one end 45 of the U-phase winding 40 and the one end 65 of the W-phase winding 60 relative to the radial direction of the stator 20, with at least a single slot 22 therebetween.

Here, voltage distribution in a switching state in a both-side driving mode is shown in FIG. 11. In FIG. 11, illustration of the first inverter unit 70, the second inverter unit 80, the first capacitor 93, the second capacitor 94, and the control unit 95 is omitted. In addition, the electric potential at each location of the windings 30 and 930, and the electric potential at the locations at which the windings 30 and 930 are in contact with the insulating film therebetween are indicated by broken lines.

Figure 11A:
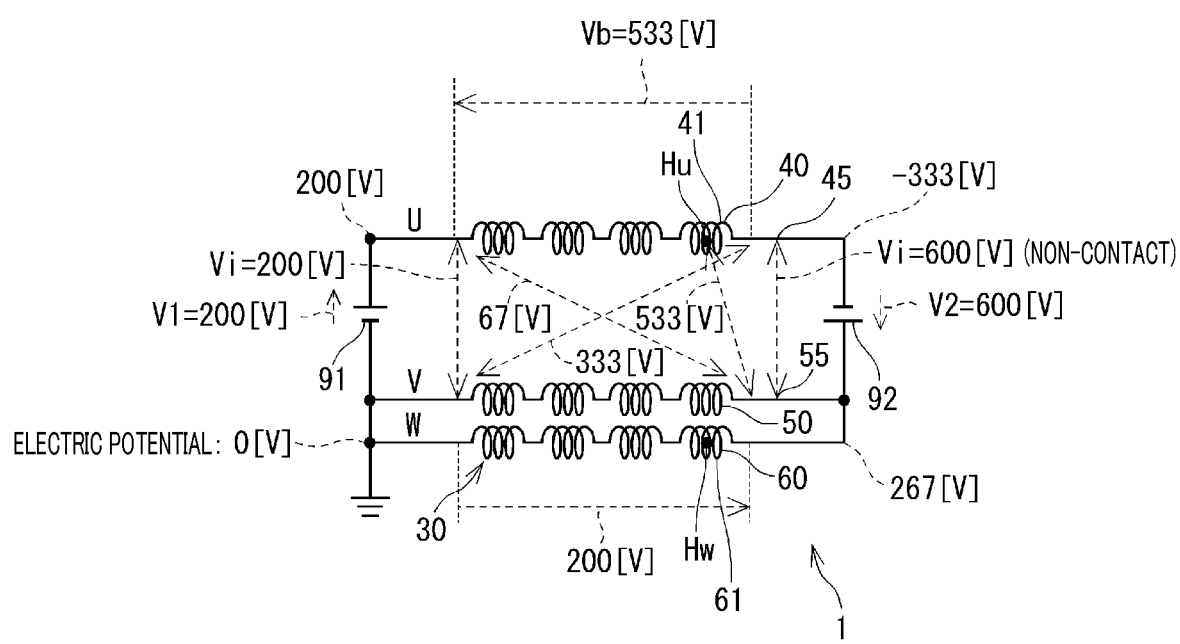
FIG. 11A is a diagram for explaining electric potential within the system according to the first embodiment.
Figure 11B:
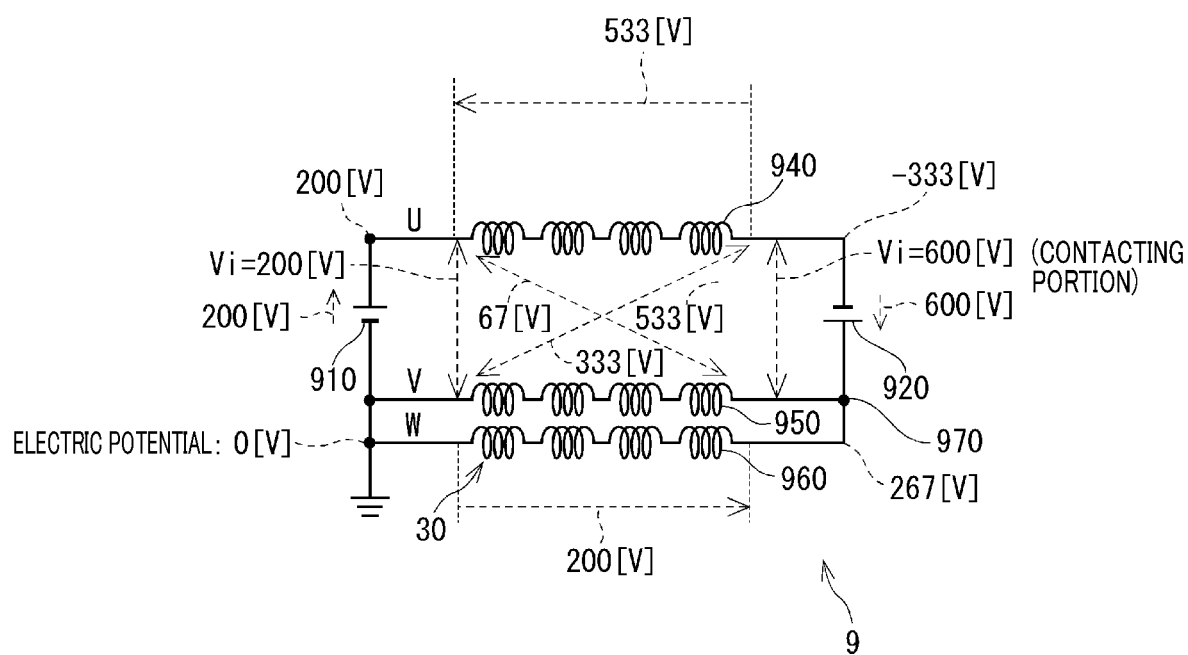
FIG. 11B is a diagram for explaining electric potential within a system in a reference example.

As shown in FIG. 11B, a power conversion system 9 that serves as a reference example includes batteries 910 and 920, and a winding 930. The voltage of the battery 910 is 200 V. The voltage of the battery 920 is 600 V. The voltage of the battery 920 is set to be higher than the voltage of the battery 910. The battery 910 is provided on one side of the winding 930. The battery 920 is provided on the other side of the winding 930.

In the winding 930, one sides of a U-phase winding 940, a V-phase winding 950, and a W-phase winding 960 are connected and set as a neutral point 970. In addition, one end of each winding 930 is in contact. In the power conversion system 9, when the voltages of the batteries 910 and 920 are applied to the winding 930, the maximum voltage in the power conversion system 9 is an interphase voltage Vi (600 V in the reference example). Therefore, an insulating film taking into consideration a surge voltage is required to be provided in the winding 930.

Meanwhile, in the power conversion system 1 according to the present embodiment, a withstand voltage of the winding 30 can be reduced and the insulating film can be made thinner. In the power conversion system 1 according to the present embodiment, when a negative-electrode side of the first battery 91 has an electric potential of 0 [V], the voltage distribution of DC components in the switching state is as shown in FIG. 11A.

A both-end voltage Vb of a single phase of which the upper and lower elements that are turned on differ from those of the other two phases and the correlative voltage Vi are expressed by expressions (1) and (2), below. At the maximum voltage location in the both-side driving mode, the voltage is the both-end voltage Vb of the U-phase winding 40, the V-phase winding 50, or the W-phase winding 60. According to the present embodiment, the both-end voltage Vb is about 533 V.

In addition, as shown in FIG. 11, in each phase, an in-phase voltage Vc that is the voltage at a location at which the likelihood of contact is present is expressed by expression (3). Here, n in expression (3) is the number of divisions of the phase windings 40, 50, and 60. According to the present embodiment, the number of divisions n=4.

$$Vb=(V1+V2)\times(2/3) \qquad (1)$$

$$Vi=(V1+V2)/2 \qquad (2)$$

$$Vc=Vb(n-1)/n \qquad (3)$$

According to the first embodiment, the one end 45 of the U-phase winding 40 is provided further towards the outer side in the radial direction than the division line P. The one end 65 of the W-phase winding 60 is provided further towards the inner side in the radial direction than the division line P. In addition, the one end 55 of the V-phase winding 50 is provided between the one end 45 of the U-phase winding 40 and the one end 65 of the W-phase winding 60 with at least a single slot 22 therebetween. As a result, the one end 45 of the U-phase winding 40, the one end 55 of the V-phase winding 50, and the one end 65 of the W-phase winding 60 are not reliably in contact with each other.

An intermediate point of the first U-phase partial winding 41 is a U-phase intermediate point Hu. The U-phase intermediate point Hu is a location at which the U-phase winding 40 is evenly divided into 8 that is a number twice the number of division n=4. An intermediate point of the first W-phase partial winding 61 is a W-phase intermediate point Hw. The W-phase intermediate point Hw is a location at which the W-phase winding 60 is evenly divided into 8 that is a number twice the number of division n=4.

At this time, the location at which the U-phase intermediate point Hu and the one end 55 of the V-phase winding 50 come into contact is a maximum voltage location. In addition, the location at which the W-phase intermediate point Hw and the one end 55 of the V-phase winding 50 come into contact is a maximum voltage location. The voltage at the maximum voltage location is 533 V.

According to the first embodiment, as a result of the one ends 45, 55, and 65 of the phase windings 40, 50, and 60 being not in contact, compared to the power conversion system 9 of the reference example, the maximum voltages at the contact locations within the motor generator 5 can be reduced. Consequently the insulating film of the winding 30 can be made thinner. Here, a "first winding" corresponds to the U-phase winding 40. A "second winding" corresponds to the W-phase winding 60. A "third winding" corresponds to the V-phase winding 50.

Second Embodiment

Figure 12:
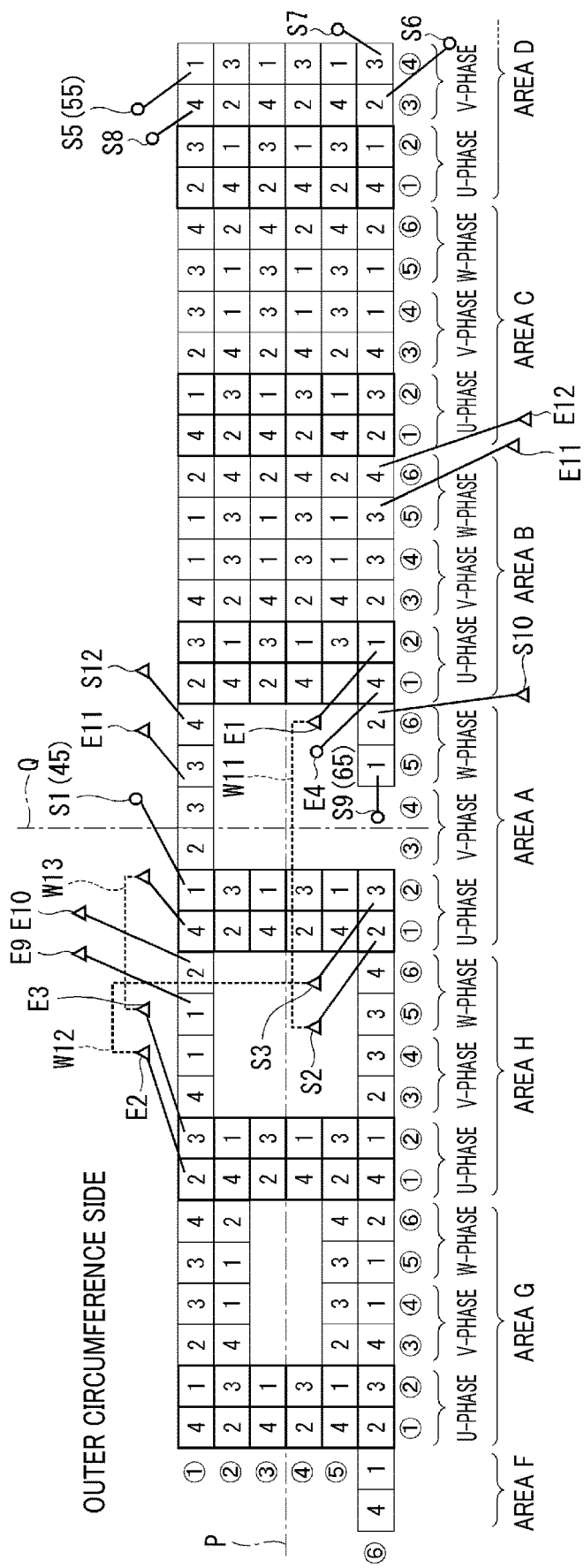
FIG. 12 is a diagram for explaining winding according to a second embodiment.

A second embodiment is similar to the first embodiment, excluding differences in the arrangement of the one ends of the phase windings and the winding direction. According to the second embodiment, the U-phase winding 40, the V-phase winding 50, and the W-phase winding are configured by a lap winding. The slot positions into which the inserting portions 36 are inserted and the winding direction according to the second embodiment will be described below with reference to FIG. 12.

In the first U-phase partial winding 41, the segment conductors 35 are connected in order from A21, H22, A23, H24, A25, H26, G21, F22, G23, F24, G25, F26, . . . C21, B22, C23, B24, C25 to B26. The first U-phase partial winding 41 is wound in order in the counter-clockwise direction, and wound from the outer side to the inner side in the radial direction.

In the second U-phase partial winding 42, the segment conductors 35 are connected in order from A16, B15, A14, B13, A12, B11, C16, D15, C14, D13, C12, D11, . . . G16, H15, G14, H13, G12 to H11. The second U-phase partial winding 42 is wound in order in the clockwise direction, and wound from the inner side to the outer side in the radial direction.

In the third U-phase partial winding 43, the segment conductors 35 are connected in order from A26, B25, A24, B23, A22, B21, C26, D25, C24, D23, C22, D21, . . . G26, H25, G24, H23, G22 to H21. The third U-phase partial winding 43 is wound in order in the clockwise direction, and wound from the inner side to the outer side in the radial direction.

In the fourth U-phase partial winding 44, the segment conductors 35 are connected in order from A11, H12, A13, H14, A15, H16, G11, F12, G13, F14, G15, F16, . . . C11, B12, C13, B14, C15 to B16. The fourth U-phase partial winding 44 is wound in order in the counter-clockwise direction, and wound from the outer side to the inner side in the radial direction.

The terminating end E1 of the first U-phase partial winding 41 and the starting end S2 of the second U-phase partial winding 42 are connected by the connecting wire W11. The terminating end E2 of the second U-phase winding 42 and the starting end S3 of the third U-phase winding 43 are connected by the connecting wire W12. The terminating end E3 of the third U-phase partial winding 43 and the starting end S4 of the fourth U-phase partial winding 44 are connected by the connecting wire W13.

In the first V-phase partial winding 51, twelve segment conductors 35 are connected in order from D41, C42, D43, C44, D45, C46, B41, A42, B43, A44, B45, A46, . . . F41, E42, D43, E44, F45 to E46. The first V-phase partial winding 51 is wound in order in the counter-clockwise direction, and wound from the outer side to the inner side in the radial direction.

In the second V-phase partial winding 52, twelve segment conductors 35 are connected in order from D36, C35, D34, C33, D32, C31, B36, A35, B34, A33, B32, A31, . . . F36, E35, F34, E33, F32 to E31. The second V-phase partial winding 52 is wound in order in the clockwise direction, and wound from the inner side to the outer side in the radial direction.

In the third V-phase partial winding 53, twelve segment conductors 35 are connected in order from D46, C45, D44, C43, D42, C41, B46, A45, B44, A43, B42, A41, . . . F46, E45, F44, E43, F42 to E41. The third V-phase partial winding 53 is wound in order in the clockwise direction, and wound from the inner side to the outer side in the radial direction.

In the fourth V-phase partial winding 54, twelve segment conductors 35 are connected in order from D31, C32, D33, C34, D35, C36, B31, A32, B33, A34, B35, A36, . . . F31, E32, F33, E34, F35 to E36. The fourth V-phase partial winding 54 is wound in order in the counter-clockwise direction, and wound from the outer side to the inner side in the radial direction.

The terminating end E5 of the first V-phase partial winding 51 and the starting end S6 of the second V-phase partial winding 52 are connected by a connecting wire. The terminating end E6 of the second V-phase winding 52 and the starting end S7 of the third V-phase partial winding 53 are connected by a connecting wire. The terminating end E7 of the third V-phase partial winding 53 and the starting end S8 of the fourth V-phase partial winding 54 are connected by a connecting wire.

In the first W-phase partial winding 61, the segment conductors 35 are connected in order from A56, B55, A54, B53, A52, B51, C56, D55, C54, D53, C52, D51, . . . G56, H55, G54, H53, G52 to H51. The first W-phase partial winding 61 is wound in order in the clockwise direction, and wound from the inner side to the outer side in the radial direction.

In the second W-phase partial winding 62, the segment conductors 35 are connected in order from A66, B65, A64, B63, A62, B61, C66, D65, C64, D63, C62, D61, . . . G66, H65, G64, H63, G62 to H61. The second W-phase partial winding 62 is wound in order in the clockwise direction, and wound from the inner side to the outer side in the radial direction.

In the third W-phase partial winding 63, the segment conductors 35 are connected in order from A51, H52, A53, H54, A55, H56, G51, F52, G53, F54, G55, F56, . . . C51, B52, C53, B54, C55 to B56. The third W-phase partial winding 63 is wound in order in the counter-clockwise direction, and wound from the outer side to the inner side in the radial direction.

In the fourth W-phase partial winding 64, the segment conductors 35 are connected in order from A61, H62, A63, H64, A65, H66, G51, F62, G63, F64, G65, F66, . . . C61, B62, C63, B64, C65 to B66. The fourth W-phase partial winding 64 is wound in order in the counter-clockwise direction, and wound from the outer side to the inner side in the radial direction.

The terminating end E9 of the first W-phase partial winding 61 and the starting end S10 of the second W-phase partial winding 62 are connected by a connecting wire. The terminating end E10 of the second W-phase partial winding 62 and the starting end S11 of the third W-phase partial winding 63 are connected by a connecting wire. The terminating end E11 of the third W-phase partial winding 63 and the starting end E12 of the fourth W-phase partial winding 64 are connected by a connecting wire.

A line that divides the slot 22 into two in the circumferential direction of the stator 20 is a division line Q. According to the second embodiment, the starting end S1 corresponding to the one end 45 of the U-phase winding 40 is provided further towards one side than the division line Q. In addition, the starting end S9 corresponding to the one end 65 of the W-phase winding 60 is provided further towards the other side than the division line Q. Furthermore, the starting end S5 corresponding to the one end 55 of the V-phase winding 50 is provided between the one end 45 of the U-phase winding 40 and the one end 65 of the W-phase winding 60 in the circumferential direction of the stator 20.

Figure 13:
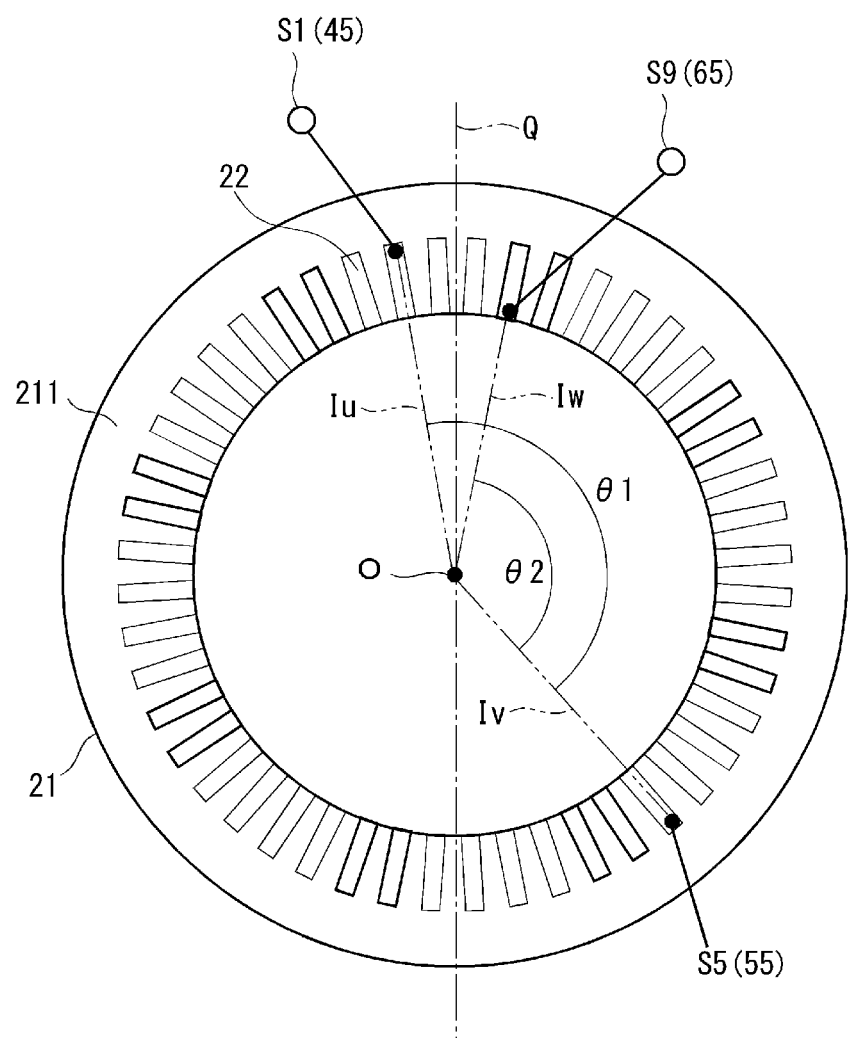
FIG. 13 is cross-sectional view of a stator core for explaining the windings according to the second embodiment.

As shown in FIG. 13, a center of the stator core 21 is O. A line from the center O to the one end 45 of the U-phase winding 40 is a U-phase virtual line Iu. A line from the center O to the one end 55 of the V-phase winding 50 is a V-phase virtual line Iv. A line from the center O to the one end 65 of the W-phase winding 60 is a W-phase virtual line Iw. An angle formed by the U-phase virtual line Iu and the V-phase virtual line Iv is a first angle $\theta1[°]$. An angle formed by the W-phase virtual line Iw and the V-phase virtual line Iv is a second angle $\theta2[°]$.

The first angle $\theta1$ is set so as to satisfy a relational expression (4), below. Alternatively, the second angle $\theta2$ is set so as to satisfy a relational expression (5), below. According to the second embodiment as well, effects similar to those according to the first embodiment are obtained.

$$\theta1 \geq 360 + M \times 2 \quad (4)$$

$$\theta2 \geq 360 + M \times 2 \quad (5)$$

Figure 14:
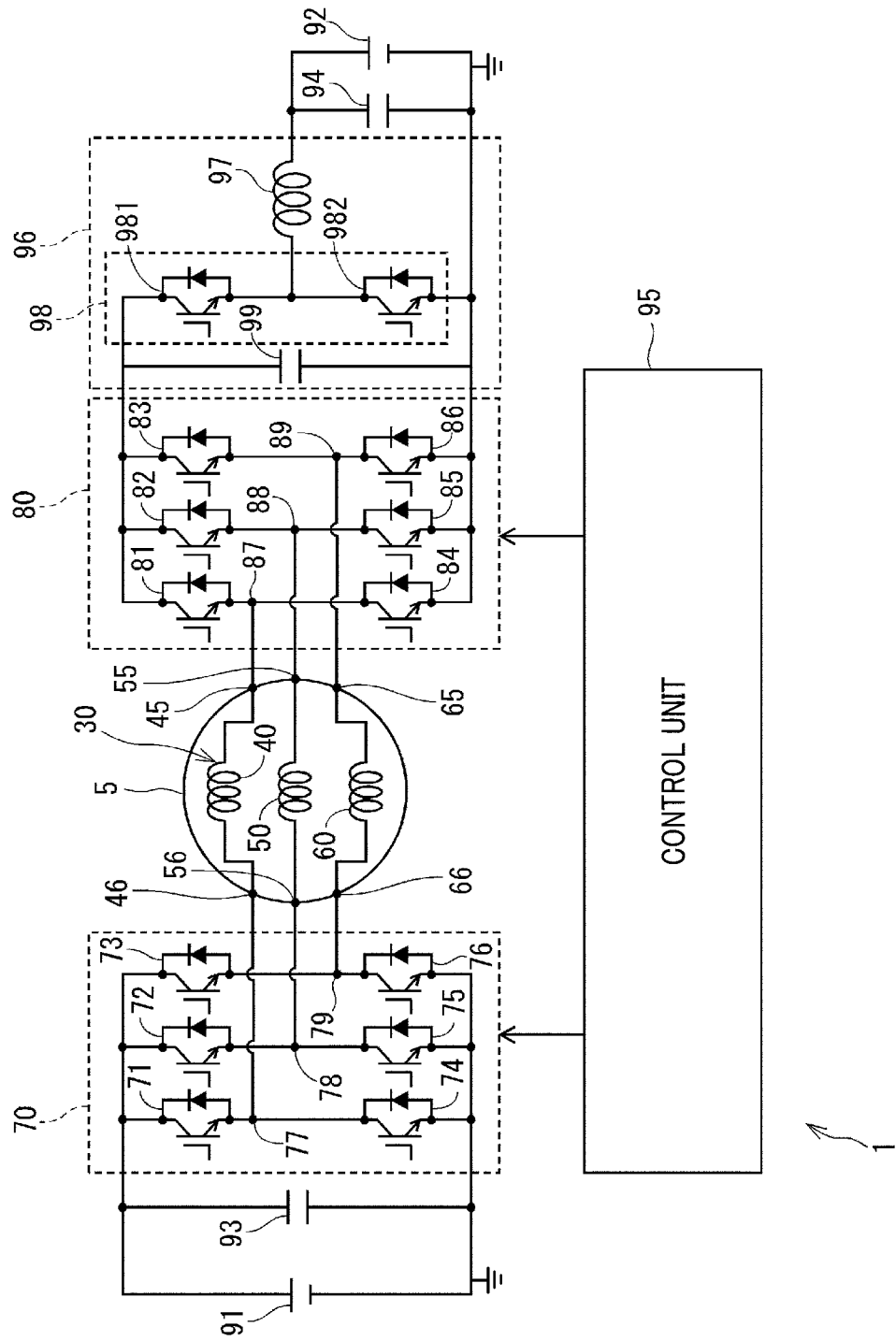
FIG. 14 is a configuration diagram for explaining a power conversion system to which a motor generator according to another embodiment is applied.

OTHER EMBODIMENTS (i) As shown in FIG. 14, a boost converter 96 may be provided between the second inverter unit 80 and the second battery 92. The second voltage V2 may be greater than the first voltage V1. The boost converter 96 includes a reactor 97, a boosting unit 98, and a smoothing capacitor 99. The boost converter 96 boosts the second voltage V2 and generates a boosted voltage Vs. The generated boosted voltage Vs is outputted to the second inverter unit 80.

The reactor 97 is capable of storing and discharging electric energy resulting from an induction voltage that is generated in accompaniment with changes in the current. The boosting unit 98 includes two switching elements 981 and 982 that are connected in series, and a freewheeling diode that is connected in parallel to the switching elements 981 and 982. The smoothing capacitor 99 is connected in parallel to the second inverter 80 between the boost converter 96 and the second inverter unit 80, and smoothes variations in the boosted voltage Vs.

(ii) According to the present embodiment, each phase winding is configured by four partial windings. The phase winding may be configured by a single winding or may be configured by a plurality of partial windings.

(iii) According to the present embodiment, the number of magnetic poles M is 8, the slot multiple k is 2, and the number of slots is 48. The number of magnetic poles M and the slot multiple k are not limited thereto and may be set to any quantity. In addition, the number of slots can be set as appropriate based on the number of magnetic poles M and the slot multiple k.

(iv) The number of segment conductors inserted into a single slot is 6 or 8. The number of segment conductors that are inserted into a single slot is not limited to 6 or 8 and may be any quantity. In addition, instead of the segment conductor, the winding may be configured by a typical conductor wire having a circular cross-section being wound.

(v) The one end and the other end of the phase winding is drawn out from the axial-direction end portion of the housing. At least either of the one end and the other end of the phase winding may be drawn outside of the housing from a location other than the axial-direction end portion of the housing.

(vi) The first inverter unit and the second inverter unit are controlled by PWM control or rectangular wave control. The control method for the first inverter unit and the second inverter unit are not limited.

(vii) The rotating electric machine may be applied to a system such as a single-power-supply single-inverter system.

(viii) The power conversion system is applied to an electric vehicle. The power conversion system may be applied to a vehicle auxiliary machine or another apparatus other than the main engine of the electric vehicle.

(ix) Either of the first power supply source and the second power supply source may be configured by an electric double-layer capacitor or a lithium-ion capacitor.

The present disclosure is not limited to such embodiments described above. The present disclosure can be carried out based on various modes without departing from the spirit of the invention.

The present disclosure is described according to the embodiments. However, the present disclosure is not limited to these embodiments and structures. The present disclosure includes various modified examples and modifications within a range of equivalents. In addition, various combinations and aspects, as well as combinations and aspects that include only a single element, or more than or less than a single element, are included in the category and conceptual scope of the present disclosure.

What is claimed is:
1. A rotating electric machine comprising:
a housing;
a shaft that is rotatably supported by the housing;
a rotor integrally rotated with the shaft, the rotor including
a plurality of pairs of magnetic poles arrayed in a circumferential direction;
a stator that includes:
a stator core with a plurality of slots arrayed in the circumferential direction;
a first winding wound around the stator core, one end of the first winding being disposed further towards an outer side of the stator in a radial direction than a division line that divides the corresponding slot into two in the radial direction, and another end of the first winding being disposed further towards an inner side of the stator in the radial direction than the division line;
a second winding wound around the stator core, one end and another end of the second winding being disposed further towards the inner side of the stator in the radial direction than the division line; and
a third winding wound around the stator core, one end of the third winding being disposed between the one end of the first winding and the one end of the second winding relative to the radial direction of the stator, with at least a single slot therebetween, and another end of the third winding being disposed further towards the outer side of the stator in the radial direction than the division line;

a first power supply source connected to the other end of the first winding, the other end of the second winding, and the other end of the third winding via a first inverter unit; and a second power supply source connected to the one end of the first winding, the one end of the second winding, and the one end of the third winding via a second inverter unit, a voltage of the second power supply source being greater than a voltage of the first power supply source.

2. A rotating electric machine comprising:

a housing;

a shaft that is rotatably supported by the housing;

a rotor integrally rotated with the shaft, the rotor including a plurality of pairs of magnetic poles arrayed in a circumferential direction;

a stator that includes:
- a stator core with a plurality of slots arrayed in the circumferential direction;
- a first winding wound around the stator core, one end of the first winding being disposed further towards an outer side of the stator in a radial direction than a division line that divides the corresponding slot into two in the radial direction, and another end of the first winding being disposed further towards an inner side of the stator in the radial direction than the division line;
- a second winding wound around the stator core, one end and another end of the second winding being disposed further towards the inner side of the stator in the radial direction than the division line; and
- a third winding wound around the stator core, one end of the third winding being disposed between the one end of the first winding and the one end of the second winding relative to the radial direction of the stator, with at least a single slot therebetween, and another end of the third winding being disposed further towards the outer side of the stator in the radial direction than the division line;

a first power supply source connected to the other end of the first winding, the other end of the second winding, and the other end of the third winding via a first inverter unit; and a second power supply source connected to the one end of the first winding, the one end of the second winding, and the one end of the third winding via a second inverter unit, a voltage of the second power supply source being greater than a voltage of the first power supply source, wherein the first, second, and third windings are configured by an n-number of partial windings that are connected in series, where n is an integer of 2 or more, and when the partial winding furthest towards the one end side of the winding is a first partial winding and the partial winding furthest towards another end side of the winding is an n-th partial winding, the first partial winding and the n-th partial winding are wound in a single direction that is a counter-clockwise direction or a clockwise direction when viewed from a same side in an axial direction of the stator.

* * * * *